Aug. 26, 1958 P. M. PAPPAS 2,848,894

THERMO-SENSOR ATTACHMENT FOR DEEP FAT FRYER

Filed May 5, 1955

INVENTOR
PHILLIP M. PAPPAS

BY E. E. Vrooman & Co.,
ATTORNEYS

United States Patent Office 2,848,894
Patented Aug. 26, 1958

2,848,894
THERMO-SENSOR ATTACHMENT FOR DEEP FAT FRYER

Phillip M. Pappas, Houston, Tex.

Application May 5, 1955, Serial No. 506,283

1 Claim. (Cl. 73—343)

It has long been the practice in commercial deep fat fryers to use a hydraulic type of thermostat with the bulb located within the cooking fat or oil. The heating of the fat causes the fluid within said bulb to expand and operate the valve or contactor mechanism of the thermostat in a remote location by means of a flexible capillary wire which carries the hydraulic fluid to a bellows or diastat which as it expands cuts off the gas or electricity supplying the heat energy to the fat. Conversely, a cooling of the fat causes said hydraulic fluid to contract which resumes flow of gas or electricity and brings the fat up to the dial set temperature.

In placing the thermostat bulb within the frying fat, it is necessary to bring the capillary wire and bulb through the pot below the grease level by means of a stuffing gland or to bring the capillary wire and bulb above the pot and down into the fat. Either of these complicates the making of the fryer and adds to the cost of same as the thermostat bulb and capillary wire must be protected from accidental injury and, further, either of these means of installing thermostat bulb in the fat restricts the removal of the fry pot from the fryer for cleaning purposes.

In addition, the placement of the thermostat bulb within the fryer pot complicates replacement of said thermostat when same becomes inoperative under constant use.

In the commercial fryer field a trend has developed toward a removable fry pot in the small counter type fryers with a fat capacity of 12–20 pounds. The removable pot of this size can easily be lifted from the fryer and the fat poured through a cloth or suitable filter and strained and the pot can be taken into the sink and washed in the same manner as an ordinary pan from the top of the stove. Further, pot replacement is, of course, simplified and costs less with removable pot of this type than is possible with a non-removable type pot which is a part of the fryer and which is ordinarily furnished with the bottom drain valve for fat removal.

The trend to the removable pots in the commercial counter model fryer field has brought forth many complicated arrangements for suspending the thermostat bulb and capillary wire within the fat in such a way that it can be swung up and out of the fat and clear of the pot so that the pot could be lifted out of the fryer. These swinging arrangements tend to injure the delicate capillary wire which has a tiny center hole for fluid passage and the damaging of the capillary wire makes the thermostat inoperative.

Of course, it is seen where the thermostat bulb enters the pot below the fat level by means of a stuffing gland, it is utterly impractical to remove the pot as said stuffing gland would have to be removed which would mean that the fat would have to be siphoned out each time and, therefore, same is not practical. It is this factor that has led to the development of the complicated swinging type mountings for the thermostat bulb and capillary wire to go into the fat from a position above the pot.

With these difficulties and complications in mind, I have invented an original means for using a standard type of thermostat with a standard round bulb mounted on the exterior of said fat container in such a manner as to provide maximum contact area with the thermostat bulb so as to maintain the fat temperature within a plus or minus five degrees Fahrenheit of the dial setting and said exterior mounting of the thermostat bulb permits quick, easy, removal of the fry pot without any necessity for swinging the bulb and capillary wire out of the way of the pot. Also said thermostat bulb is not exposed to the acid and carbonizing action of the frying fat and, further, cannot be injured by the user either with the frying baskets or with a fork as sometimes happens when the chef is forking in the fat for a piece of the food being fried. Of course, it will be seen too that the elimination of any swinging arrangement simplifies manufacturing, cuts cost and eliminates service difficulties as well as provides for quick, easy thermostat replacement using the standard type of thermostat.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Fig. 1 is a vertical central sectional view of an apparatus constructed in accordance with the present invention, while

Figure 1:
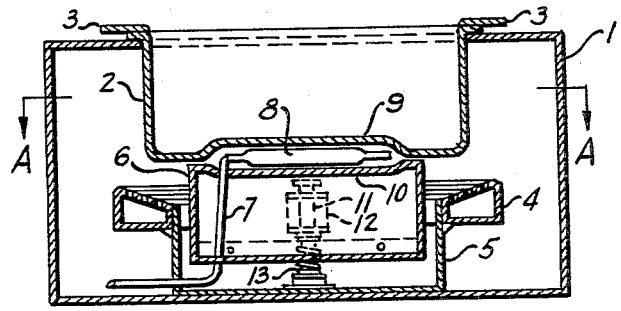

Referring to the drawings by numerals, Fig. 1 shows a front elevated view cut away along the lines C—C to show the thermosensor attachment, and 1 is the fry pot cabinet which supports the removable lift-out fry pot 2, with handles 3 for lifting same from the cabinet, and 4 is the gas burner with supporting means 5 attached to floor 17 of the cabinet, and 6 is the thermo-sensor housing which is filled with suitable insulation such as fiberglass or mineral wool to protect the thermostat capillary wire 7, and 8 is the thermostat bulb showing same in position against the half-rounded hump 9, which is formed in the center of the pot 2, so as to provide a large contact area with the round thermostat bulb 8; while 10 is a half-round depression formed in the top of the thermo-sensor housing 6, which keeps the thermostat bulb 8 in the proper position so that when the pot 2 is removed and replaced, the bulb 8 fits into the hump 9 of the pot; while the thermo-sensor housing 6 is slidably-mounted to the floor of the fryer by means of bolts 11, which extend through clearance holes in the U-brackets 12, which are attached to the sides of the housing 6 with compression springs 13 mounted underneath the U-brackets 12, so as to hold the thermostat bulb 8 by spring compression against the half-round hump portion 9 of said pot 2.

Figure 2:
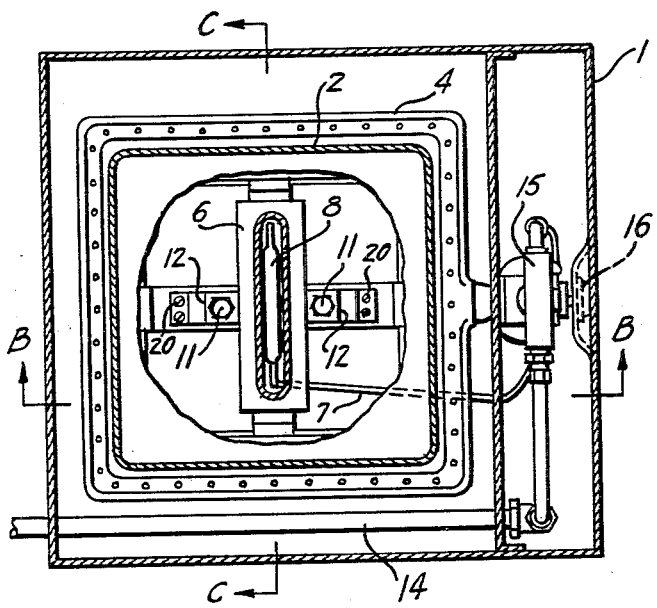
Fig. 2 is a horizontal sectional view taken on line A—A, looking in the direction of the arrows.

Fig. 2 shows said fryer cut away along line A—A, and in operation, gas enters the supply pipe 14, and goes into the thermostat housing 15, which houses an hydraulically expanding bellows or diastat for cutting off the flow of gas when the temperature setting of the dial 16 is reached. When fat is placed in the pot 2 and the burner 4 is ignited, the operator will set the dial 16 for the desired temperature for the food to be fried. When the fat reaches the desired temperature the fry pot or cooking vessel 2 will transmit the heat of the fat to the thermostat bulb 8, which will cause the fluid to expand through capillary wire 7 in such a manner as to expand the bellows or diastat within the thermostat housing 15 and cut off the flow of gas. Conversely, as the fat cools either by the surrounding air or when cold food is placed in the fat for cooking, said cooling action will be transmitted to the fat, which will cool the temperature of the metal fry pot 2, which in turn will cause the fluid in bulb 8 to contract, which, by means of the capillary wire 12 will cause a contraction of the bellows or diastat in thermostat housing 15, which will cause the flow of gas to the burner to be resumed, where it is ignited by a stand-by pilot (not shown). The thermostat bulb 8 is located in the center of the square burner 4, and as the secondary air for combustion is obtained from the center portion of the burner, neither the bulb 8 or the thermostat capillary wire 7 will be exposed to heat from the burner. The thermo-sensor housing 6 is filled with fibreglass or mineral wool, to protect the capillary wire 7 and thermostat bulb 8 from the radiation of the burner heat.

Figure 3:
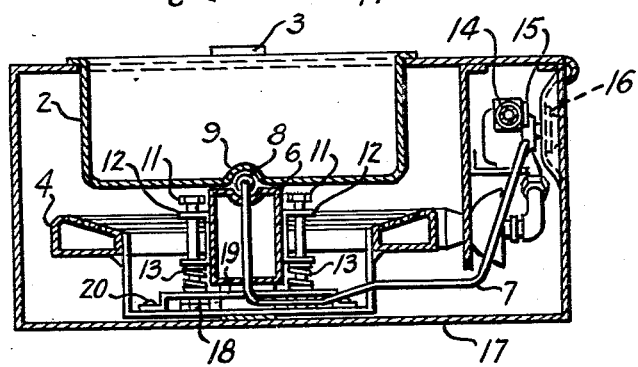
Fig. 3 is a sectional view taken on line C—C, looking in the direction of the arrows.

Fig. 3 shows the said fryer along line B—B, and bolts 11 carry the thermo-sensor housing 6 in a limited slidable manner by means of U-brackets 12, attached to the thermo-sensor housing 6 with compression springs 13, exerting an upward pressure which is more than offset by the weight of the fry pot 2, so that when the pot is placed in the cabinet the springs 13 exert an upward pressure which holds the thermostat bulb 8 tightly against the formed hump 9 in the bottom of the center of the fry pot 2, thus maintaining close contact necessary for the sensitive operation of the thermostat; while bolts 12 are secured by means of nuts 18 held in place by bracket 19, which is attached to the floor of the cabinet 17 by means of screws 20; and this arrangement permits an adjustment of the amount of upward travel of the thermo-sensor housing 6 by means of turning bolts 11 in a counter-clockwise direction.

Figure 4:
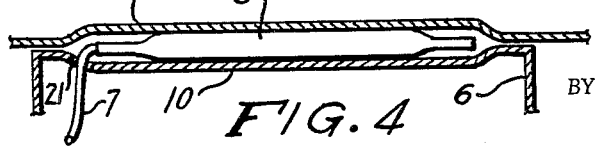
Fig. 4 is an enlarged fragmentary view showing the thermostat bulb.

Fig. 4 shows an enlarged view of the formed hump 9, in the said fry pot, showing thermostat bulb 8, capillary wire 7, and the half-round formed depression 10, in the top of the rectangular thermo-sensor housing 6; while a hole 21 permits the capillary wire 7 of the thermostat to traverse the insulated thermo-sensor housing 6 to the floor 17 of the fryer where it parallels the floor 17 below the burner heat, to the thermostat housing 15; while said hole 21 is large enough to permit the thermostat bulb 8 to be removed for replacement purposes.

The upward bulge 9 and the downward bulge 10 form a pocket for the bulb 8.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In an apparatus of the class described, the combination with a casing, of a pot provided in its bottom at the center thereof with an inverted narrow elongated half-round shaped bulge in cross section, a thermo-sensor housing provided with a centrally-positioned elongated narrow depending half-round shaped bulge in cross section registering with said first-mentioned bulge, and said registering similar bulges forming a totally enclosed elongated tube-like closed central narrow pocket for receiving a narrow tube-like hydraulic thermostat when said housing and pot are assembled.

References Cited in the file of this patent

UNITED STATES PATENTS

| | | |
|---|---|---|
| 947,914 | Junkers | Feb. 1, 1910 |
| 1,047,417 | Kercher | Dec. 17, 1912 |
| 2,500,061 | Clark | Mar. 7, 1950 |
| 2,534,097 | Akeley | Dec. 12, 1950 |
| 2,699,487 | Turner | Jan. 11, 1955 |